(12) United States Patent
Agostino et al.

(10) Patent No.: US 6,519,452 B1
(45) Date of Patent: Feb. 11, 2003

(54) METHOD AND SYSTEM FOR OPTIMIZING WIRELESS COMMUNICATION SYSTEM PERFORMANCE

(75) Inventors: Remo L. Agostino, Richardson, TX (US); Steven W. Cook, Flower Mound, TX (US); Robert P. Lauderdale, II, Richardson, TX (US)

(73) Assignee: Nortel Networks Limited, Richardson, TX (US)

( * ) Notice: Subject to any disclaimer, the term of this patent is extended or adjusted under 35 U.S.C. 154(b) by 0 days.

(21) Appl. No.: 09/420,295

(22) Filed: Oct. 18, 1999

Related U.S. Application Data (60) Provisional application No. 60/157,263, filed on Oct. 1, 1999.

(51) Int. Cl.⁷ .......................... H04Q 7/20; H04B 17/00
(52) U.S. Cl. ................ 455/423; 455/67.1; 455/429; 455/446; 455/435; 370/252; 370/337; 370/347
(58) Field of Search ................. 370/252, 337, 370/347; 455/423, 67.1, 429, 432, 435–448, 446, 453, 422, 439, 67.7, 502, 440

(56) References Cited

U.S. PATENT DOCUMENTS

| | | | | |
|---|---|---|---|---|
| 5,859,838 A | * | 1/1999 | Soliman | 370/249 |
| 5,943,324 A | * | 8/1999 | Ramesh et al. | 370/321 |
| 6,088,588 A | * | 7/2000 | Osborne | 455/418 |
| 6,134,444 A | * | 10/2000 | Kotzin | 455/423 |
| 6,154,638 A | * | 11/2000 | Cheng et al. | 455/67.1 |
| 6,229,481 B1 | * | 5/2001 | Katz | 342/367 |
| 6,253,060 B1 | * | 6/2001 | Komara et al. | 455/11.1 |
| 6,347,234 B1 | * | 2/2002 | Scherzer | 455/550 |

* cited by examiner

*Primary Examiner*—Vivian Chin
*Assistant Examiner*—Edan Orgad
(74) *Attorney, Agent, or Firm*—Haynes & Boone, LLP (57) ABSTRACT

A system and method for a simultaneous examination of synchronized forward and reverse link data of a telecommunication network is provided. An RF optimizer system first gathers inputs from both the forward link data as saved by a mobile diagnostic unit (MDU) and the reverse link data as provided by a mobile telephone exchange (MTE), and then merges and synchronizes these two distinct and individual data sets. Various parametric data can be viewed simultaneously from different perspectives (map, grid, graph, message views) with each individual perspective to be synchronized with all others.

27 Claims, 5 Drawing Sheets

| MU | MTE | DELTA 1=-23s | DELTA 2=+7s |
|---|---|---|---|
| 10:00:00 ORIGINATION DMAC(5) CHAN(573) | 10:02:46 ORIGINATION DMAC(7) CHAN(777) ←38 | | |
| 10:02:23 ORIGINATION DMAC(7) CHAN(777) ←36 | 10:14:10 PAGE RESPONSE DMAC(6) CHAN(719) ←40 | 10:02:23 ORIGINATION DMAC(7) CHAN(777) ←38 | 10:02:23 ORIGINATION DMAC(7) CHAN(777) |
| 10:13:54 PAGE RESPONSE DMAC(6) CHAN(719) ←42 | 10:17:03 ORIGINATION DMAC(5) CHAN(623) | 10:13:47 PAGE RESPONSE DMAC(6) CHAN(719) ←40 | 10:13:54 PAGE RESPONSE DMAC(6) CHAN(719) |

METHOD AND SYSTEM FOR OPTIMIZING WIRELESS COMMUNICATION SYSTEM PERFORMANCE

CROSS REFERENCE

This application claims the benefit of U.S. Provisional Application Ser. No. 60/157,263, filed Oct. 1, 1999.

BACKGROUND

The present invention relates generally to telecommunication systems, and more particularly, to a system and method for evaluating and optimizing system performance of a wireless telecommunication network.

Telecommunication networks deploying various communication technologies such as Time Division Multiple Access (TDMA), Code Divsion Multiple Access (CDMA), and the like, are co-existing today. Every owner or operator of a radio frequency (RF) telecommunication network, in order to thrive in the industry, has to continuously evaluate and upgrade the performance of the network. It is a never ending quest to ensure optimal RF coverage, voice quality, and capacity and hence maximize subscriber satisfaction. Evaluation and optimization of a network are costly processes for the owners or operators. Any tools or methodologies developed to mitigate this cost are extremely beneficial.

For most of telecommunication networks, there is a mobile telephone exchange (MTE) including hardware infrastructures such as base transmission stations and switches that frequently communicates through various messages with a mobile unit (MU). Communications initiated from the MTE to the MU are known to be through a forward link or a downlink, while other communications started from the MU back to the MTE are through a reverse link or a uplink. Therefore, in evaluating the performance of a network, a mobile diagnostic unit (MDU) is normally used in conjunction with a MU so that the MDU can record forward link data received by the MU. On the other end of the communication link, the MTE saves information about the reverse link data as it has perceived. The MDU contains measured parameters such as Mobile Assistant Handoff metrics based on the forward link signal quality and contains a full air interface message set for both the forward and reverse link communication. Also, the MTE usually stores only a subset of the air interface messages and is lacking in certain parameters characterizing the forward link signal quality. In any event, it is not unusual that some events or messages are lost in the communications between the MDU and the MTE so that the data collected at both ends can be different. Especially for the purpose of evaluating the performance of the network, it is extremely important for engineers to analyze both the forward link data collected by the MDU and the reverse link data saved in the infrastructure by the MTE. A MU is a device many of whose actions are controlled by the MTE, and the MTE makes such decisions in a real time fashion for actions such as a Handoff, a change in signal power level based on predetermined algorithms using various parametric data it has received from the MU. Only by studying details of this information, including communication messages and parametric data with aligned time stamps attached thereto from the perspectives of both the MDU and the MTE, are the engineers able to tell what has happened during the earlier communication that has caused unsatisfactory performance of the network and, based on such findings, adjust system parameters to optimize the network performance in the future. Moreover, optimization of RF features such as mobile power control, base station power control, and handoffs, or the like, involve a reiterative process of parameter adjustments.

A post-operation data processing system and method is thus needed to facilitate the simultaneous examination of synchronized forward and reverse link data. Additionally, it would be advantageous to provide for displaying, simultaneously from different perspectives, various network parameters during the reiterative process of parameter adjustments.

SUMMARY OF THE INVENTION

A system and method for a simultaneous examination of synchronized forward and reverse link data of a telecommunication network is provided. In one example, a radio frequency (RF) optimizer designed for time division multiple access (TDMA) technology is provided for gathering inputs from both the forward link data as saved by the MDU and the reverse link data as provided by the MTE. The optimizer merges and synchronizes these two distinct and individual data sets. The gathered and merged data, and other parametric data, can be viewed simultaneously from different perspectives, e.g., map, grid, graph, message views, with each individual perspective to be synchronized with one or more, or all others.

The system also provides the capability to view the characteristic and interaction behavior, via parametric data, of several intertwining RF features. The system thus addresses the difficulty engineers experience in adjusting the numerous radio frequency features, due to the fact that certain features interact with each other, by setting optimal parameters for one feature that may be detrimental to the other. This further ensures a better performance of a telecommunication network and brings efficiency and convenience to analyzing and optimizing the performance of the telecommunication network.

In one example, provided is a system or method for optimizing a network's performance using a mobile diagnostic unit (MDU), the MDU storing at least one mobile data file having performance data of the network detected by a mobile unit saved therein, the network also having a mobile telephone exchange (MTE) storing at least one MTE data file which has performance data of the network saved by the MTE, where the MDU and MTE both have an instrument clock. The system or method operates to synchronize the MDU's clock time with the MTE's clock time; collect the at least one mobile data file from the MDU; collect the at least one MTE data file from the MTE; construct an updated MTE file registry to include the collected at least one MTE data file; query the MTE registry to match the collected at least one mobile data file to a MTE data file stored therein; synchronize the matched mobile data file and the MTE data file; merge the matched mobile and MTE data file into one integrated data file; analyze data in the integrated data file; simultaneously display the analyzed data in two or more interface views; and adjust at least one network parameter based on the analyzed data, whereby the simultaneously displayed data is depicted in such a manner that interface views are synchronized such that individually selecting a data point in any view updates respective information in all other views, and further wherein adjusting one network parameter causes an indication of simultaneous changes in related network parameters.

In another aspect, a method is provided for depicting the performance of a time division multiple access wireless telecommunication network, the network having a mobile telephone exchange (MTE) communicating to at least one mobile unit, the method comprising merging and synchronizing forward link and reverse link radio frequency parametric, message, and location data; and generating and displaying call processing events of the MTE on a detailed geographical map; wherein the call processing events are decision making steps taken by the MTE to determine necessary changes pertaining to the at least one mobile unit.

An advantage of the system is that it provides the ability to view the characteristics and interaction behavior via parametric data of several intertwining RF features of a telecommunications network. Thus, the system provides for efficiency and convenience in analyzing and optimizing the performance of the network.

DESCRIPTION OF THE PREFERRED EMBODIMENT

Figure 1:
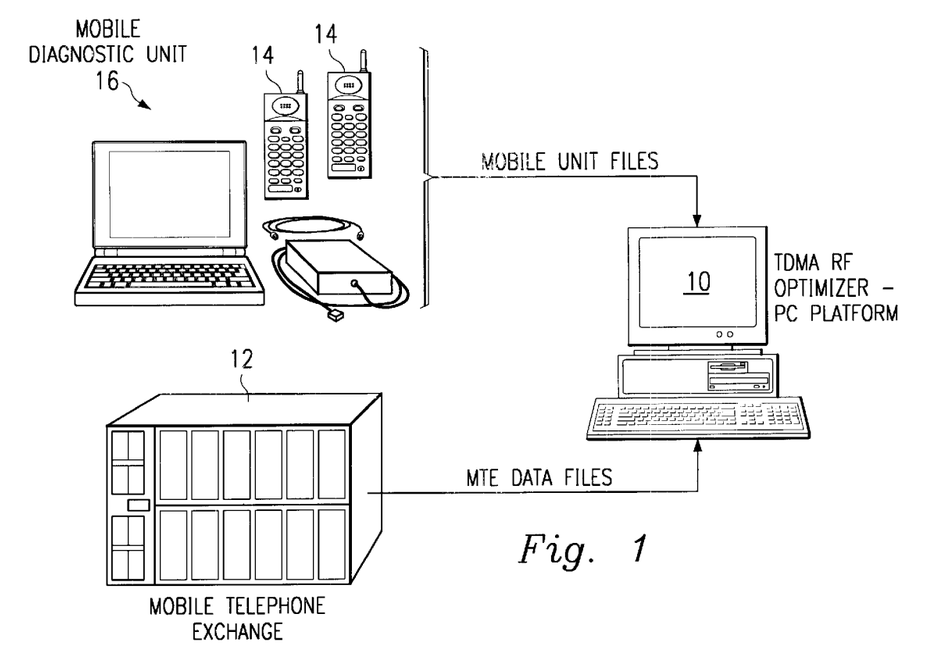
FIG. 1 is a schematic view of a radio frequency optimizer system according to one embodiment of the invention.

Referring now to FIG. 1, a time division multiple access (TDMA) radio frequency (RF) optimizer system 10 is shown in accordance with one embodiment of the present invention. While the system 10 is designed for use with TDMA technology, other applications of the principles disclosed herein are contemplated. The present system 10, directed for use in TDMA applications, is thus one example only.

A telecommunication network usually has a hardware control infrastructure such as a mobile telephone exchange (MTE) 12 which may include base stations and switches. Under the coverage of the MTE 12, at least one mobile unit (MU) 14 communicates with the MTE 12 through messages or commands in a predetermined time sequence through a certain RF carrier. Moreover, when engineers are sent to analyze the performance of the network, it is almost always that a mobile diagnostic unit (MDU) 16 is connected to a MU 14 under study. Thus the MDU 16 can collect data received by the MU 14. In order to evaluating the performance of the network, the MTE 12 periodically records the reverse link data and some of the forward link data in a MTE data file (or simply, "MTE file"), and the forward link data received by the MU 14 are also periodically stored in a MDU's mobile data file (or simply, "MU file"). For the sake of simplicity, it is assumed, for illustration purpose only, that the MTE file contains reverse link data from one or more MUs 14 under its coverage and some of forward link data, and each MU file includes forward link data received by one MU 14 only.

Figure 2:
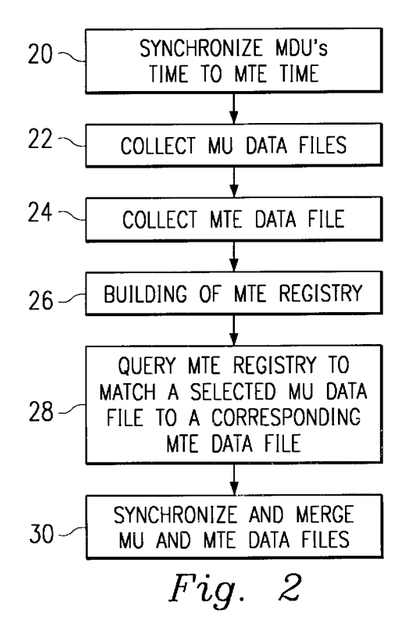
FIG. 2 is flow diagram illustrating steps taken by the optimizer system of FIG. 1, for data processing.

FIG. 2 is a flow diagram showing steps taken by the optimizer system 10 to process data collected from both the MDU 16 and the MTE 12. In step 20, the MDU's computer time has to be synchronized to that of the MTE's. This is important because a discrepancy in instrument time between the MDU 16 and the MTE 12 may render it impossible to merge and synchronize the data files. Once the time for the MDU 16 and the MTE 12 are aligned, then the system 10 gathers both the MU file from the MDU 16 in step 22 and the MTE file as well in step 24. In step 26, a MTE Registry is built. The MTE Registry is an independent file database that is updated whenever a new MTE file is added thereto. It includes the starting date time stamp, ending date time stamp, and a MU's identification number such as a MIN or an ESN parameter of each MTE file. Since one MTE file could correspond to multiple MU files, building the MTE Registry eliminates the need to duplicate MTE files. In step 28, the existing MTE Registry is queried to match a selected MU file to a corresponding MTE file. As the MU files are processed, the beginning and ending date time stamps and the MINs/ESNs in the MTE Registry are compared to what is found in the MU file. Once the MU file is matched with a particular MTE file, both files are merged and synchronized in step 30 so that the forward and reverse link data may be viewed together.

Figure 3:
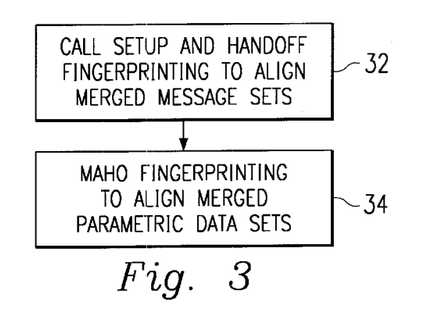
FIG. 3 is a flow diagram of the operation of the system of FIG. 1 illustrating steps taken for merging and synchronizing a mobile unit data file and a mobile telephone exchange file.

Referring to FIG. 3, delineated are two steps accomplished in step 30 of FIG. 2. First, call setup and handoff fingerprinting is done to align the merged message sets in step 32, and subsequently, a Mobile Assisted Hand Off (MAHO) fingerprinting is carried out to align the merged parametric data sets in step 34. For the purpose of illustration in this application, the terms "parametric data" are equivalent to the terms "parametric parameters" or "metrics."

Since the time stamps for the MU file and MTE file may not exactly correspond to each other, a synchronization algorithm may be used to calculate the time difference (delta) in time stamps between the MU file and the MTE file. It is possible for each call segment in a matched set of MU file and MTE file to require a different delta for synchronization. A call segment refers to an entire call session from a beginning to an end regardless of the reason for its termination. Further, the synchronization algorithm allows a different time delta to be applied to each call segment, if necessary. In merging and synchronizing the data, the MU file is considered the master file for time stamps, messages, and parametric data. The time stamps in the MTE file will be altered in order to synchronize with the MU file.

For aligning the merged message sets in step 32, first, the system 10 scans the MU file to find messages associated with an initiation of a call segment, i.e., call setup, such as Origination, Page Response messages, and their associated parameters such as DMAC and Channel, etc. Next, the MTE file is searched for messages which correspond to the call setups found in the MU file. In order to be deemed a match, specific setup metrics must match; this includes parametric data such as the MTE's call setup messages and Initial Traffic Channel Designation (ITCD) parameters echoed by the MU 14. Once a satisfactory match is found, the time delta between the time stamps of the Origination or Page Response in the two files is calculated. This time delta is applied to the MTE file for the call segment just matched.

Figure 4:
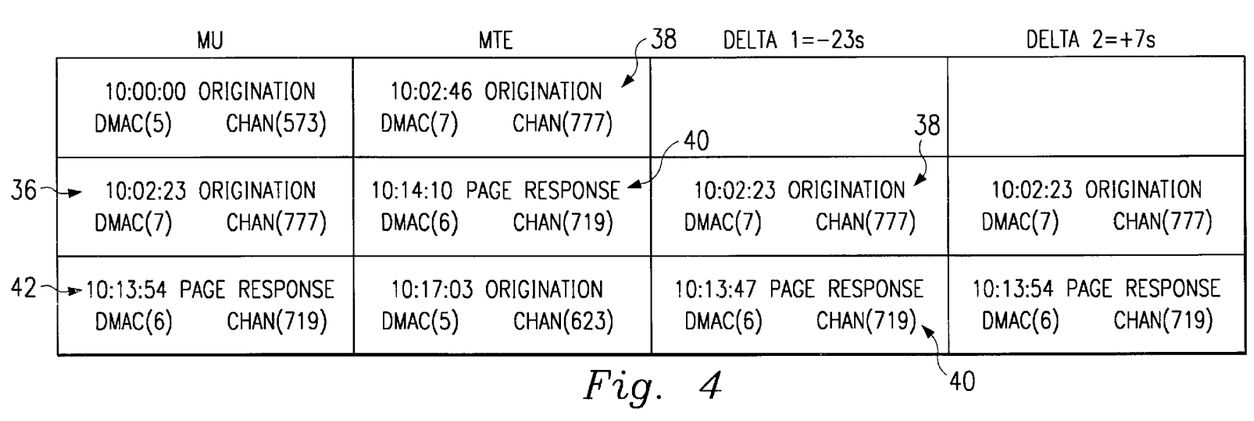
FIG. 4 is a chart illustrating, for the system of FIG. 1, the process of calculating necessary time differences between time stamped messages.

For example, FIG. 4 is a chart showing the process of calculating necessary time deltas between the time stamps. The data under column "MDU" are time stamped messages perceived by the MDU 16, and similarly, the data under column "MTE" are time stamped messages stored in the MTE 12. For instance, since entry 36 matches with entry 38 in both DMAC and CHAN parameters for both Origination messages, it is an indication that these two messages should be aligned. However, there is a time difference between 10:02:46 of entry 38 and 10:02:23 of entry 36. Thus, a first time delta of −23, which is the difference in time of these two entries, is applied throughout the MTE entries. For the sake of presentation, under the column "Delta 1=−23s," MTE entries are "pushed down" so that entry 38 is now aligned with entry 36. Now, entry 40 for a Page Response message is aligned with entry 42, but because of the application of the first time delta, it bears a time stamp different from entry 42. Therefore, a second time delta of +7 is added to compensate this "loss" and readjust the time stamps for a better alignment. This process can go on until the last entry in this call segment of the MTE file is perfectly aligned with that of the MDU entries. It is understood that various other parameters such as Time Slot, Digital Verification Color Code, Time Alignment, and Short Burst Handoff Indicators, etc., can be used for the purpose of alignment in additional to DMAC and CHAN. Further, handoff message sets in a call segment is also aligned and their respective time stamps are adjusted. That is, after the first call setup message set in a call segment is aligned, each handoff message set of the MU file is synchronized to that of the MTE file.

The process is applied to subsequent call segments until all the call segments including their handoff message sets are aligned. It is understood that when this matching process is applied to the call segments it is very likely that different time deltas are required for different call segments. In addition, this fingerprinting or matching process seems to match the entries of the MTE file with those in the MU file exactly, but in reality, there is a small slot packaging or propagation delay involved, which may amount to at least 40 milliseconds. The system 10 addresses this problem by universally offsetting corresponding entries by a user defined delay.

Once the call segments and their messages in the two files have been synchronized, the associated parametric data sets must be synchronized to reflect more about the communications between the MDU 16 and the MTE 12. This MAHO fingerprinting process may result in a different time delta being used than that used for message synchronization. For example, the MU file contains Mobile Assisted Handoff (MAHO) and serving channel data. The MTE file contains MAHO data, plus many other parametric data. But the MAHO data is common to both files.

Whenever a handoff occurs in a call segment, the MAHO fingerprinting process is applied. Beginning with the first call segment in the MU file, a first MAHO measurement row (usually any of MAHO 1 through 6) is compared to MAHO measurement rows in the corresponding MTE file's corresponding call segment. If a match is found, the time delta between the MU file and MTE file time stamps is calculated. This time delta is applied to other parametric data for the current call segment. If no match is found, or if a match is found but the time delta is greater than fifteen seconds, the process begins again using the next MAHO measurement row in the MU file call. If no match is found after ten consecutive MAHO measurement rows of the MU file having been examined, the time delta calculated during the message synchronization is used.

Figure 5:
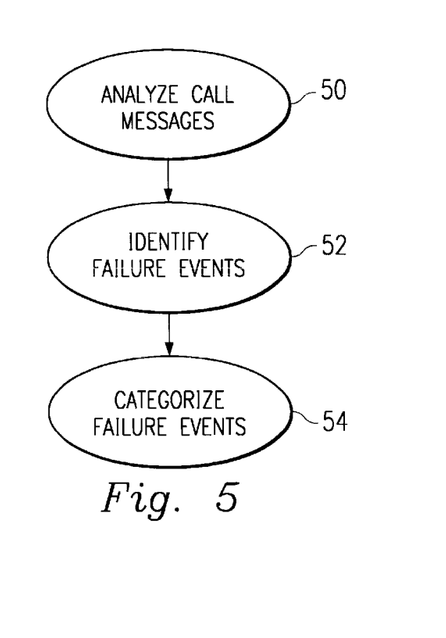
FIG. 5 is a flow diagram illustrating, for the system of FIG. 1, steps taken for evaluating the performance of a telecommunication network.

The system 10 also uses call models to evaluate the network performance. As shown in FIG. 5, three steps are described for completing the evaluation. First, in step 50, all call messages are analyzed, and subsequently in step 52, failure events are identified. After the failure events are pinpointed, they are categorized in classes.

The system 10 uses call model algorithms to determine call statistics, e.g., originations, completions, access failures, dropped calls, dropped handoffs and abnormal calls. There are two separate call models, the MU model and the MTE model. The selection of a call model used for processing depends upon the type of data files picked for data processing. For the MU files or the merged file, the MU call model is used, and the MTE call model is used for MTE files only. There are more than one mode in each call model, and each mode of the model requires that specific messages be present in order to move to the next mode. The determination of the outcome of the call depends upon the messages logged in the file.

The MU call model is based upon the analysis of IS-136 standard messages logged by the MDU 16. For illustration purpose, names of some messages defined by a MTE hardware manufactured by Nortel Networks are used below. Other manufacturers may use similar, but may not be exactly the same, names for these messages. A call segment begins when an Origination or Page Response is received. Based on the messages in the file, a call segment progresses through various modes: from an Idle mode to an Origination mode, further to a Conversation mode, and then back to the Idle mode. If, at any point in the call's progress through the modes, a call returns to the Idle mode before the next expected message, the call segment is considered a dropped call.

To correctly determine call statistics, the appropriate messages must be captured in the file. This is especially true of the messages which indicate the start and end of a call. If these messages are not captured, the call segment will not be included in the statistics. Usually, this is due to failures in the data collection procedure. For example, the logging process of the MTE or the MDU is stopped before the call ends normally. In cases where the beginning (call setup) or end of a call (release) is not captured in the data file, the system 10 will define these call segments as Abnormal Calls. From the Idle mode, the appearance of either an Origination or a Page Response message indicates a start of the Origination mode. The Origination mode may have one of two outcomes, Access Failure or Completion. In general, there are three possible types of Access Failure defined by the MU call model, determined by the sequence of messages:

Access Failure 1:
  1) Origination
  2) The MU 14 returns to the Idle mode (camping on Control Channel) and never receives the Digital Traffic Channel Designation (DTCD).

Access Failure 2:
  1) Page Response
  2) The MU 14 returns to the Idle mode (camping on Control Channel) and never receives the Digital Traffic Channel Designation (DTCD).

Access Failure 3:
  1) Origination or Page Response
  2) Digital Traffic Channel Designation (DCTD)
  3) The Mobile returns to the Idle mode (camping on Control Channel) and never receives the Physical Layer Control for Time Alignment.

From the Origination Mode, a call Completion is flagged by the following sequence of messages from the MU file. A Completion means that the call has assumed the traffic channel, and the call segment is moved into the Conversation mode. All three messages must be received to determine that the call is completed. They are Digital Traffic Channel Designation (DTCD), Physical Layer Control Time Alignment (PLC TA), and Physical Layer Control Acknowledgment Time Alignment (PLC Ack TA). Further, the Completion may have one of three outcomes: Normal Call, Dropped Call or Dropped Handoff. From the Conversation mode, if a Forward or Reverse Release message is received, the call segment is determined to have been terminated normally. Once a call segment has reached the Conversation mode, a dropped call is indicated when the call returns to the Idle Mode before a Normal Burst Handoff Acknowledgment (NB HO Ack) message, before a Shortened Burst Handoff Acknowledgment (SB HO Ack) message, or before a Forward or Reverse Release message.

Further, in the Conversation mode, Dropped Handoffs are deemed to occur after a handoff has begun, but before the handoff is completed. The following sequences are used to determine a dropped handoff. For shortened burst handoffs, if the call segment returns to the Idle Mode after the Shortened Burst Handoff Acknowledgment (SB HO Ack) message, but before the Physical Layer Control Acknowledgment (Time Alignment) (PLC Ack TA) message. For normal burst handoffs, if the call segment returns to the Idle Mode after the Normal Burst Handoff Acknowledgment (NB HO Ack), but before the earliest of a Measurement Order Acknowledgment, a Physical Layer Control Acknowledgment, or a six seconds having elapsed (DVCC Loss timer).

The MTE call model is similar to the MU model, but differs in the following aspects. First, there are four possible types of Access Failure, defined by the sequence of messages. The Access failures for the MTE call model are defined as follows: Access Failure 1:
1) PAGE_REQUEST
2) PAGE_RESPONSE
3) After the page response, no further messaging activity is received associated with the specific page request.

Access Failure 2:
1) PAGE_REQUEST
2) PAGE_RESPONSE
3) SETUP_AND_WAIT
4) CALL_FAILURE
5) RELEASE_OUTGOING Access Failure 3:
1) ORIGINATION
2) SETUP
3) After SETUP, no further messaging activity is received associated with the specific origination Access Failure 4:
1) ORIGINATION
2) SETUP
3) CALL_FAILURE
4) RELEASE_OUTGOING Further, from the Origination Mode, call Completion is flagged by either of the following sequences of messages: Completion 1 (Origination scenario)
1) SETUP
2) DVCC_PRESENT Completion 2
1) SETUP_AND_WAIT
2) Any MTE message that is part of a call after setup (Handoff Candidate, RSSI_Req, RSS_Response, etc.)

The Completion 2 scenario differs from Completion 1 in that there is no specific message to indicate successful transition from the Shortened Burst (SB) Mode to the Normal Burst (NB) mode, while in Completion 1, DVCC_PRESENT is the indicator. Technically, it is this successful transition which indicates a call completion. A failure to complete a transition from the Shortened Burst Mode to the Normal Burst Mode is considered to be an access failure. From the Conversation mode, if a Release or Clear Back/Forward message is received, the call segment is determined to have been terminated normally.

Moreover, once a call segment has reached to the Conversation Mode, a dropped call is indicated when the call returns to the Idle Mode after either a DVCC_PRESENT message or six seconds having elapsed from a SETUP_AND_WAIT message. In addition, a dropped handoff occurs, either for the Shortened Burst or the Normal Burst handoffs, if the call segment returns to the Idle Mode after a HANDOFF_ACK message, but before a DVCC_PRESENT message.

Furthermore, in evaluating the network performance, it is important for an engineer to know a gap or an imbalance between an uplink RF footprint and a downlink RF footprint in terms of signal strength. The process to do such evaluation is known as a path balance study. The information about this imbalance is necessary for operating certain network algorithms. And if this gap is too large, it can be responsible for various performance failures of the network.

Figure 6:
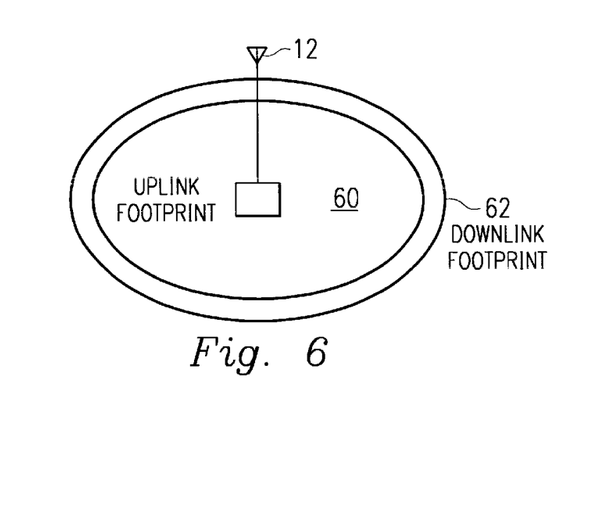
FIG. 6 is a schematic representation, for the system of FIG. 1, illustrating a radio frequency coverage gap between a downlink radio frequency footprint and a uplink radio frequency footprint with respect to a mobile telephone exchange.

Now referring to FIG. 6, a MTE or a base station 12 and a corresponding uplink RF footprint 60 and a downlink RF footprint 62 are shown. In a conventional method of analyzing the network performance, an engineer has to make a special trip in the field and drive in the coverage area, and continuously communicate with another engineer in the MTE's location to read certain parameters to determine the boundaries of both footprints. The Optimizer 10 now eliminates the need to do so. By processing the data in the data files, a path balance calculation is done and the result can be displayed clearly to the engineers. The system 10 calculates the average difference between a Short Term Forward RSSI and a Short Term Reverse RSSI value, taking into account the power control for each link. The parametric data used in the calculations include:

Mobile Station Power Level (MSPL);
Base Station Power Step (BSPwrStep);
Base Station Power Index (BSPwrNdx);
Serving Sector (Sector);
Short Term Forward RSSI (STFRSSI);
Short Term Reverse RSSI (STRRSSI);
Maximal Base Station Power Level; and
Maximal Mobile Power Level.

Figure 7:
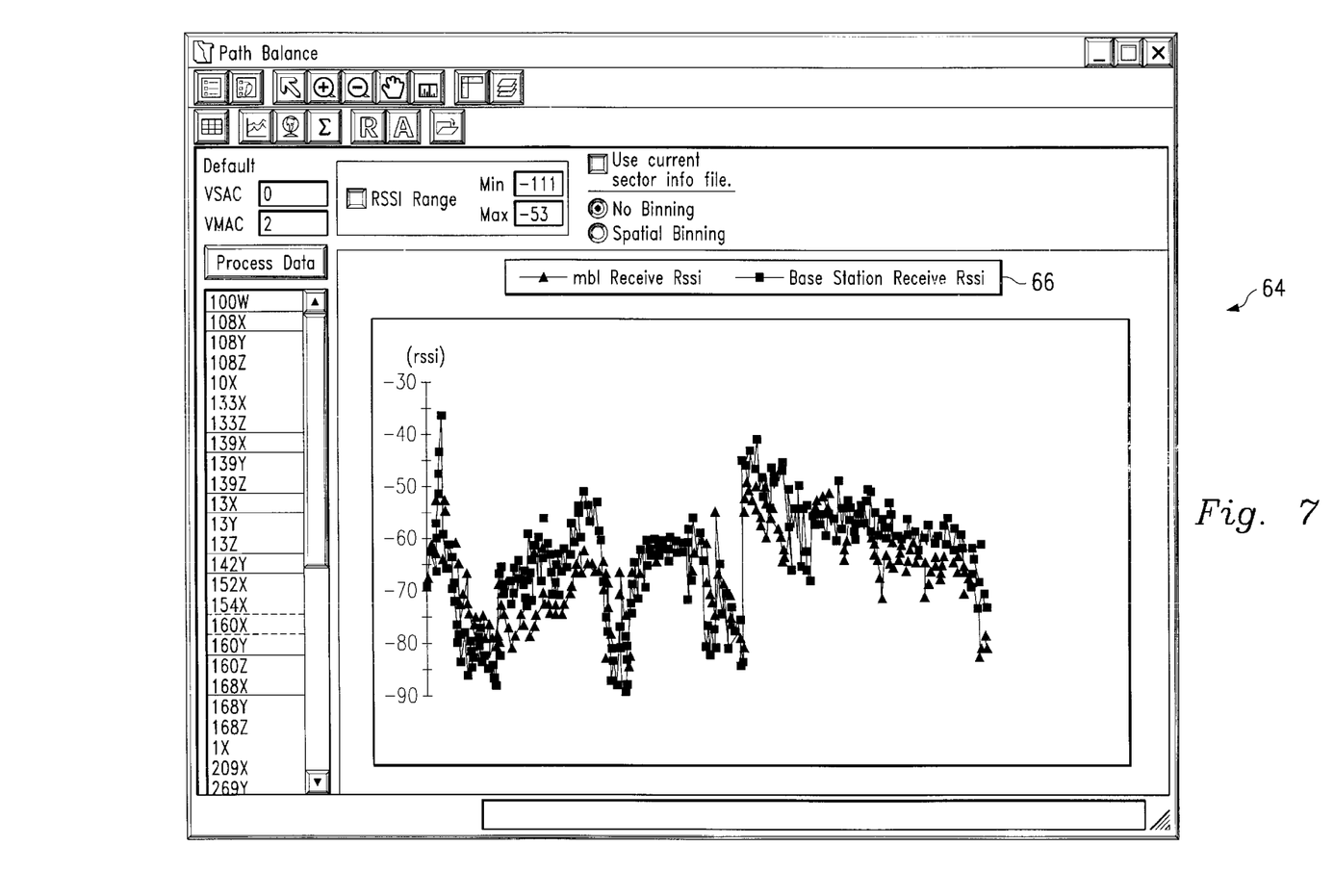
FIG. 7 is a screen display generated by the system of FIG. 1, illustrating a path balance calculation.
Figure 8:
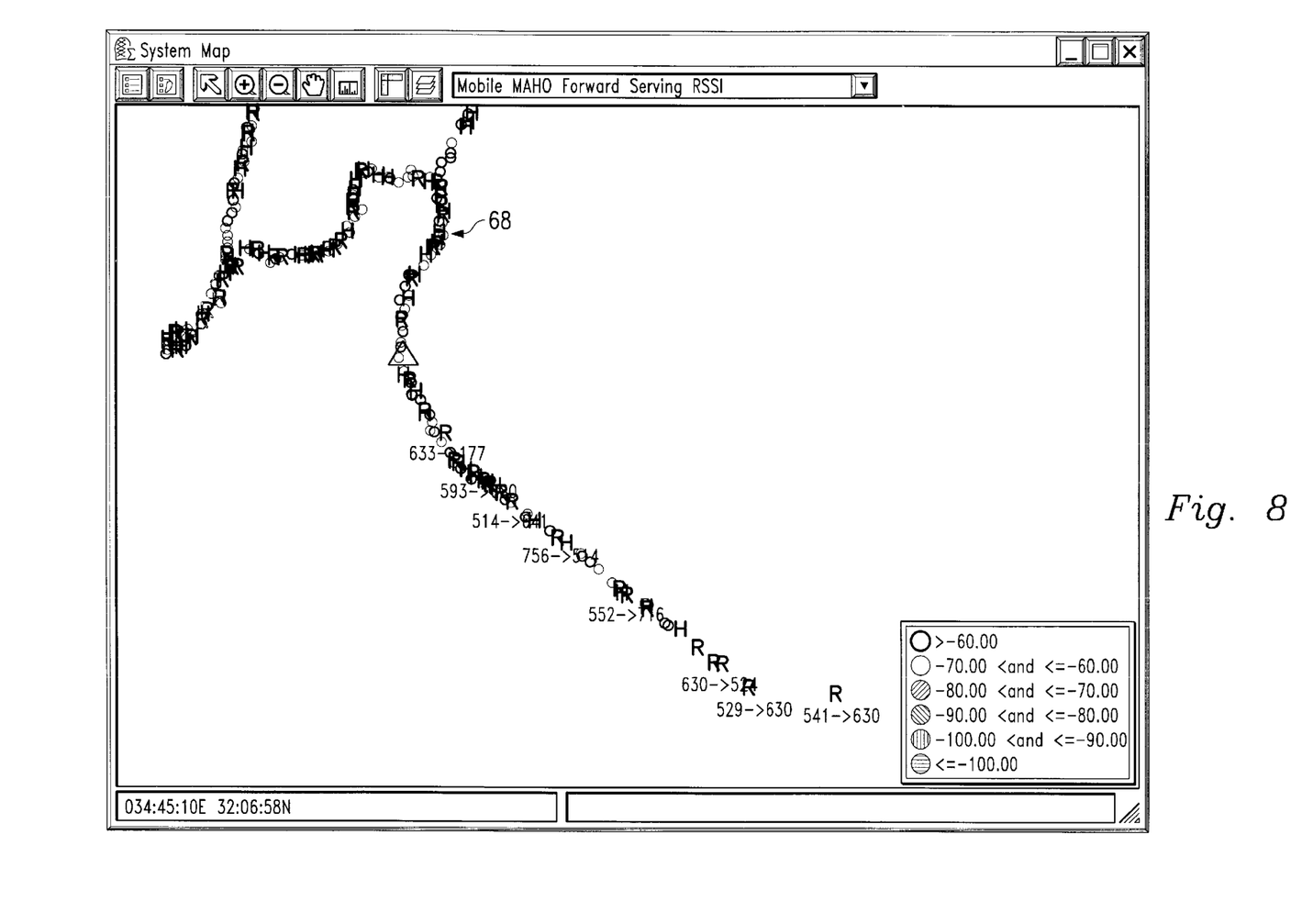
FIG. 8 is a screen display generated by the system of FIG. 1, illustrating the result of a path balance calculation superimposed over a geographical map.

FIG. 7 is a screen display after the data are processed for the path balance study. The right bottom part of the screen is a frame 64 which shows a comparison data chart for RSSI values from the perspective of the MTE 12. A bar 66 above the frame 64 indicates the line patterns used for plotting both RSSI values. FIG. 8 is a map view of the processed data. A travel path 68 is shown to indicate the route the engineer has actually traveled through with the MDU 16, and the differences between the Forward and Reverse RSSI values taking into consideration of power control for both links are superimposed thereon. With this feature, it is thus easier for the engineer to detect the imbalance of the downlink and the uplink RF footprints so that parameters can be adjusted to optimize the performance of the network.

Figure 9:
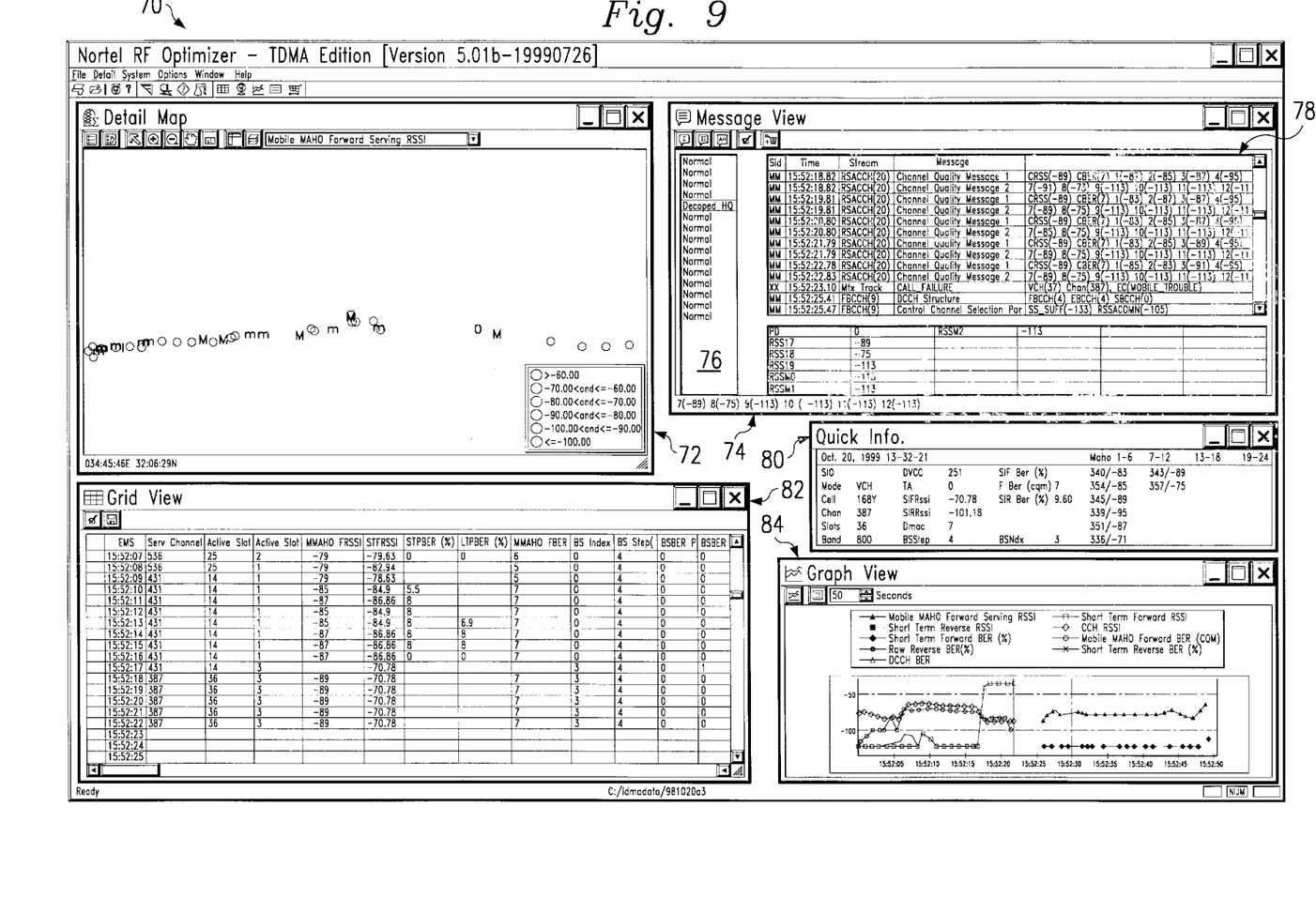
FIG. 9 is a screen display generated by the system of FIG. 1, illustrating is a multiple frame display of information.

FIG. 9 is a graphical user interface (GUI) display 70 for the system 10. Multiple graphical frames are shown on this GUI display 70. Upper left corner is a frame 72 for a map view showing various data plotted over a geographical map. A frame 74 in the upper right corner shows a text message view in which details of various messages are shown. All the messages after the merge and synchronization are already arranged in an appropriate time sequence. Highlighting a particular call segment in a call list 76 will automatically select the first message of that particular segment in the detail message frame 78. Highlighting a dropped call or a dropped handoff will similarly select a last traffic channel message in this call segment. Underneath the frame 74, a summary view 80 displays a set of key parameters for the particular segment selected in the frame 74. In the lower left corner of the GUI display 70, a grid view 82 presents more information about the selected message. A frame 84 in the lower right corner of the GUI display 70 is a graph view in which the values of related parameters to the selected call segment are plotted within a time window. Moreover, all the information in different frames are synchronized together, a change in one of them may invoke updates in other frames so that the engineer who uses the system 10 can always be informed with accurate data. This GUI provides the engineers with a great tool for diagnosing failure events. For example, if the Dropped Handoff in the call list 76 of the message view is selected, the message with a time stamp of 15:52:21:79 for that call segment, which is the last traffic channel message, is automatically highlighted in the detail message frame 78. The summary view 80 shows the values of some key parameters such as Cell, Chan, Slots, Band, DVCC, TA, DMAC, etc, pertaining to the time indicated by the time stamp of the selected message. Similarly, the displays in the map view frame 72, grid view frame 82, and the graph view frame 84 are all synched pertaining to the particular selected message.

By merging and synchronizing the forward link and reverse link radio frequency parametric, message, and location data from the MU file and the MTE file, it is possible to generate and display various call processing events of the MTE on a detailed geographical map. These call processing events are decision making steps taken by the MTE to determine whether certain changes should be made or certain events should be triggered. These events under normal circumstances are not detected by the MU or the MDU. For example, the MTE exchanges messages with related base transmission stations before it triggers a handoff. Other processing events include, for instance, handoff retries, digital locate measurements, and base station power control.

One other difficulty for engineers to adjust the numerous radio frequency features is that certain features interact with each other and setting optimal parameters for one feature may be detrimental to the other. The Optimizer 10 also provides the engineers with the capability to view the characteristic and interaction behavior via parametric data of several intertwining RF features. The system 10 allows the engineer to evaluate these changed parametric data pertaining to all involved RF features in the GUI screen through all different perspectives. This further brings efficiency and convenience to analyzing and optimizing of the performance of a telecommunication network.

The above disclosure provides many different embodiments, or examples, for implementing different features of the invention. Although techniques and requirements are specific to certain embodiments, they may be imported into other embodiments. Also, specific examples of components, and processes are described to help clarify the invention. These are, of course, merely examples and are not intended to limit the invention from that described in the claims.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for optimizing a network performance using a mobile diagnostic unit (MDU), said MDU stores at least one mobile data file having performance data of the network detected by a mobile unit saved therein, the network having a mobile telephone exchange (MTE) storing at least one MTE data file which has performance data of the network saved by the MTE, said MDU and MTE both having an instrument clock, said method comprising the steps of:

synchronizing the MDU's clock time with the MTE's clock time;

collecting the at least one mobile data file from the MDU;

collecting the at least one MTE data file from the MTE;

constructing an updated MTE file registry to include the collected at least one MTE data file;

querying the MTE registry to match the collected at least one mobile data file to a MTE data file stored therein;

synchronizing the matched mobile data file and the MTE data file;

merging the matched mobile and MTE data file into one integrated data file;

analyzing data in the integrated data file;

simultaneously displaying the analyzed data in two or more interface views; and adjusting at least one network parameters based on the analyzed data, wherein said simultaneously displayed data depicted in such a manner that interface views are synchronized such that individually selecting a data point in any view updates respective information in all other views, and further wherein adjusting one network parameter causing an indication of simultaneous changes in related network parameters.

2. The method of claim 1 wherein the step of synchronizing further includes the steps of:

aligning time stamped messages sets; and aligning time stamped parametric parameters.

3. The method of claim 2 wherein both the steps of aligning include a step of calculating at least one appropriate time delta to adjust the time stamps.

4. The method of claim 1 wherein the MTE registry is constructed by using a starting time, an ending time, and a mobile unit identification information of each MTE data file.

5. The method of claim 1 wherein the step of analyzing further includes a step of identifying failure events based on sequenced messages and parametric parameters in the integrated data file.

6. The method of claim 1 wherein the step of analyzing further includes a step of using a call model to determine call statistics.

7. The method of claim 6 wherein the call statistics includes origination, completion, access failure, dropped calls, dropped handoffs, and abnormal calls.

8. The method of claim 1 wherein the step of analyzing further includes the step of conducting a path balance study to determine a coverage imbalance between a forward link radio frequency footprint and a reverse link radio frequency footprint.

9. The method of claim 8 wherein the path balance study uses certain network parameters including mobile station power level, base station power step, base station power index, serving sector, short term forward RSSI, short term reverse RSSI, maximal mobile power level, and maximal base station power level.

10. A method of depicting the performance of a time division multiple access wireless telecommunication network, the method comprising the steps of:

merging and synchronizing forward link and reverse link radio frequency parametric, message, and location data;

simultaneously generating and updating at least two different views of the parametric, message, and location data;

wherein the simultaneously viewed data is depicted in such a manner that all data views are synchronized and such that individually selected data points are highlighted in all chosen views.

11. The method of claim 10 wherein the at least two views any of chronological graphical view; a chronological grid view; a chronological message view; a detailed map view; or a summary information view.

12. The method of claim 10 wherein the step of merging and synchronizing includes the steps of:

synchronizing a mobile diagnostic unit (MDU)'s instrument time with a mobile telephone exchange (MTE)'s instrument time;

collecting at least one forward link data file from the MDU, the forward link data file including the parametric, message, and location data as detected by the MDU;

collecting at least one reverse link data file from the MTE, the reverse link data file including the message and parametric parameters as detected by the MTE; and matching the forward link data file with a reverse link data file.

13. The method of claim 12 further includes the step of constructing an updated reverse link file registry to include the collected at least one reverse link data file.

14. The method of claim 10 wherein the step of merging and synchronizing includes the steps of:

aligning time stamped messages;

aligning time stamped parametric; and identifying failure events based on time sequenced messages and parametric.

15. The method of claim 10 further includes a step of conducting a path balance study to determine a radio frequency coverage imbalance between a forward link footprint and a reverse link footprint.

16. The method of claim 15 wherein the path balance study uses certain network parameters including mobile station power level, base station power step, base station power index, serving sector, short term forward RSSI, short term reverse RSSI, maximal mobile power level, maximal base station power level.

17. A system for optimizing a time division multiple access telecommunication network performance, said system comprising:

a mobile diagnostic unit (MDU) storing at least one mobile data file having performance data of the network detected by a mobile unit;

a mobile telephone exchange (MTE) storing at least one MTE data file having performance data of the network saved by the MTE; and a radio frequency network performance optimizer for evaluating the performance of the network based on the mobile data file and the MTE data file, wherein the optimizer comprises:

means for synchronizing a MDU's instrument clock with a MTE's instrument clock;

means for collecting the at least one mobile data file from the MDU;

means for collecting the at least one MTE data file from the MTE;

an updated MTE file registry to include the collected at least one MTE data file;

means for querying the MTE registry to match the collected at least one mobile data file to a MTE data file stored therein;

means for synchronizing the matched mobile data file and the MTE data file;

means for merging the matched mobile and MTE data file into one integrated data file;

means for analyzing data in the integrated data file;

one or more user interface views simultaneously displaying the analyzed data; and means for adjusting at least one network parameters based on the analyzed data, wherein said simultaneously displayed data depicted in such a manner that user interface views are synchronized such that individually selecting a data point in any view updates respective information in all other views, and further wherein adjusting one network parameter causing an indication of simultaneous changes in related network Parameters.

18. The system of claim 17 wherein the means for synchronizing further includes:

means for aligning time stamped messages sets; and means for aligning time stamped parametric parameters.

19. The system of claim 18 wherein both means for aligning include a means for calculating at least one appropriate time delta to adjust the time stamps.

20. The system of claim 17 wherein the MTE file registry is constructed by using a starting time, an ending time, and a mobile unit identification information of each MTE data file.

21. The system of claim 17 wherein the means for analyzing further includes a means for identifying failure events based on time sequenced messages and parametric parameters in the integrated data file.

22. The system of claim 17 wherein the means for analyzing further includes a means for using a call model to determine call statistics.

23. The system of claim 22 wherein the call statistics includes origination, completion, access failure, dropped calls, dropped handoffs, and abnormal calls.

24. The system of claim 17 wherein the optimizer further includes a means for conducting a path balance study to determine a radio frequency coverage imbalance between a forward link footprint and a reverse ink footprint.

25. The system of claim 24 wherein the path balance study uses certain network parameters including mobile station power level, base station power step, base station power index, serving sector, short term forward RSSI, and short term reverse RSSI.

26. A method of depicting the performance of a time division multiple access wireless telecommunication network, said network having a mobile telephone exchange (MTE) communicating to at least one mobile unit, said method comprising the steps of:

merging and synchronizing forward link and reverse link radio frequency parametric, message, and location data;

generating and displaying call processing events of the MTE on a detailed geographical map;

wherein the call processing events are decision making steps taken by the MTE to determine necessary changes pertaining to the at least one mobile unit.

27. The method of 26 wherein the call processing events include handoff triggers, base station power control, digital locate measurements and handoff retries.

\* \* \* \* \*

UNITED STATES PATENT AND TRADEMARK OFFICE
CERTIFICATE OF CORRECTION

PATENT NO. : 6,519,452 B1  
DATED : February 11, 2003  
INVENTOR(S) : Agostino et al.

It is certified that error appears in the above-identified patent and that said Letters Patent is hereby corrected as shown below:

Title page,
Item [73], Assignee, please delete "Richardson, Texas" and add instead -- St. Laurent, Quebec, Canada --.

Signed and Sealed this

Thirteenth Day of July, 2004

JON W. DUDAS  
*Acting Director of the United States Patent and Trademark Office*